US005633302A

United States Patent [19]
Adachi et al.

[11] Patent Number: 5,633,302
[45] Date of Patent: May 27, 1997

[54] METHOD FOR THE PREPARATION OF ONE-PACKAGE ROOM-TEMPERATURE-VULCANIZABLE SILICONE ELASTOMER COMPOSITIONS

[75] Inventors: Hiroshi Adachi; Toshio Saruyama, both of Chiba Prefecture, Japan

[73] Assignee: Dow Corning Toray Silicone Co., Ltd., Tokyo, Japan

[21] Appl. No.: 590,265

[22] Filed: Nov. 21, 1995

[30] Foreign Application Priority Data

Nov. 24, 1994 [JP] Japan ................... 6-314182

[51] Int. Cl.⁶ .................................... C08K 5/24
[52] U.S. Cl. .................. 524/262; 524/493; 524/588; 524/264; 524/268; 524/731
[58] Field of Search ................... 524/262, 493, 524/588, 264, 268, 731

[56] References Cited

U.S. PATENT DOCUMENTS

| | | | |
|---|---|---|---|
| 5,247,011 | 9/1993 | Tsuji et al. | 524/731 |
| 5,266,631 | 11/1993 | Arai et al. | 524/847 |
| 5,290,851 | 3/1994 | Ishida et al. | 524/731 |
| 5,432,218 | 7/1995 | Mikami et al. | 524/262 |

FOREIGN PATENT DOCUMENTS

| | | |
|---|---|---|
| 41361 | 2/1990 | Japan . |
| 53902 | 8/1992 | Japan . |
| 353565 | 12/1992 | Japan . |

*Primary Examiner*—Mark D. Sweet
*Attorney, Agent, or Firm*—Roger H. Borrousch

[57] ABSTRACT

A method for the preparation of a non-yellowing one-package room-temperature-curable silicone elastomer composition that prior to its cure is highly workable and that during its cure does not crack or fissure even when deformed by an outside force. The method comprises as step one mixing of silanol-containing polydiorganosiloxane and inorganic filler; as step two admixing vinyltrioximosilane into the mixture of step one; and as step three admixing an alkyltrioximosilane into the mixture of step two.

3 Claims, No Drawings

METHOD FOR THE PREPARATION OF ONE-PACKAGE ROOM-TEMPERATURE-VULCANIZABLE SILICONE ELASTOMER COMPOSITIONS

BACKGROUND OF THE INVENTION

1. Field of the Invention

This invention relates to a method for the preparation of one-package, room-temperature-vulcanizable, (RTV) silicone elastomer compositions. More particularly, this invention relates to a method for the preparation of a one-package RTV silicone elastomer composition that prior to its cure is highly workable and that during its cure will not crack or fissure even when deformed by an outside force.

2. Description of the Prior Art

One-package RTV silicone elastomer compositions are in wide use as sealants, coatings, and adhesives for application to substrates, machinery, and devices in a number of sectors, such as the construction and civil engineering sectors, general manufacturing, and electrical and electronic sectors. The use of these one-package RTV silicone elastomer compositions involves their storage in a sealed container, such as a tube or cartridge; then, at the actual point of application, extrusion of the silicone elastomer composition as a paste; and thereafter finishing the surface to smoothness using, for example, a spatula. Thus, the surface of the composition must not cure for the particular period of time elapsing from extrusion into the atmosphere until finishing. Moreover, even when the surface has begun to cure, additional time is required for the curing region to develop adequate mechanical strength, and deformation of the composition by outside forces is problematic during the time interval extending from cure initiation at the surface until the development of mechanical strength. In specific terms, when subjected to a stretching or elongational deformation, the curing region will rupture due to its inadequate mechanical strength. This occurrence of rupture in one location can lead to fracture of the entire body after its cure due to stress concentration at the aforesaid rupture site.

The occurrence of rupture during the course of curing can be prevented by increasing the cure rate of subject silicone elastomer compositions, but simply increasing the cure rate functions to shorten the working time available for spatula finishing. The use of this approach is also associated with a ready tendency for the silicone elastomer composition to yellow during storage. Therefore, it is desirable to develop a one-package RTV silicone elastomer composition that exhibits an acceptable working time and still rapidly develops mechanical strength once curing has started.

Within the realm of one-package RTV silicone elastomer compositions, numerous compositions have already been proposed that use oxime group-containing organosilane as crosslinker, such as Toshiba Silicone KK in Japanese Patent Application Laid Open (Kokai or Unexamined) Number Hei 2-41361, published Feb. 9, 1990; Shinetsu Chemical Ind. Co in Japanese Patent Application Laid Open Number Hei 4-353565, published Dec. 8, 1992; Arai et al in U.S. Pat. No. 5,266,631, issued Nov. 30, 1993 (based on Japanese Patent Application Laid Open Numbers Hei 4-366171 (1992) and Hei 5-105813 (1993); and Japanese Patent Publication Number Hei 4-53902 [53,902/1992]. These compositions evidence low invasiveness into the adherend and excellent storage properties. This prior work provides numerous examples that use vinyltrioximesilane or methyltrioximesilane as the oxime group-containing organosilane and also gives examples in which these two crosslinkers are used in combination. However, this prior work cannot solve the problems described above.

SUMMARY OF THE INVENTION

Problems to Be Solved by the Invention

The inventors achieved the present invention as the result of extensive research directed to solving the problems described above.

In specific terms, the present invention relates to a method for the preparation of a non-yellowing one-package RTV silicone elastomer composition that prior to its cure is highly workable and that during its cure does not crack or fissure even when deformed by an outside force.

Means Solving the Problems and Function Thereof

The present invention relates to a method for the preparation of a one-package, room-temperature-vulcanizable silicone elastomer compositions comprising (1) mixing
   (a) 100 parts by weight of a silanol-endblocked polydiorganosiloxane having a viscosity at 25° C. of 0.0005 to 0.3 m²/s and
   (b) 5 to 200 parts by weight of inorganic filler,
(2) admixing into the product obtained from (1)
   (c) 0.5 to 7 parts by weight of vinyltrioximosilane with the following formula $$CH_2=CHSi(OX)_3$$

wherein each X is an organic radical with the formula $—N=CR^1R^2$ where $R^1$ and $R^2$ both represent a monovalent hydrocarbon radicals having no more than 6 carbon atoms per radical; an organic radical with the formula

where $R^3$ represents divalent hydrocarbon radicals having no more than 10 carbon atoms; or a $C_1$ to $C_4$ monovalent hydrocarbon radical with the proviso that $C_1$ to $C_4$ monovalent hydrocarbon radicals constitute no more than 30 mole % of X; and
(3) admixing into the mixture obtained in (2)
   (d) 1 to 10 parts by weight organosilane with the following formula $$R^4Si(OX)_3$$

wherein $R^4$ represents a saturated monovalent hydrocarbon radicals having no more than 6 carbon atoms and X is defined as above.

DETAILED DESCRIPTION OF THE PREFERRED EMBODIMENTS

The polydiorganosiloxane constituting component (a) is the base ingredient of the composition prepared by the method of this invention, and it must have at least 30 weight percent of its molecules with silanol groups at both of their molecular chain terminals. Its viscosity at 25° C. must fall in the range from 0.0005 to 0.3 m²/s (500 to 300,000 centistokes) for the following reasons: viscosities below 0.0005 m²/s result in a low postcure mechanical strength; viscosities in excess of 0.3 m²/s cause the silicone elastomer composition to have a very poor precure workability. The polydiorganosiloxane may be branched as long as the extent of the branching is moderate. In addition, up to 70 weight percent of the polydiorganosiloxane molecules can have at least 50 mole % of their terminals present as the hydroxyl group, the remainder may be endblocked by an inert group such as the trimethylsiloxy group and the like, as shown by Dupree in U.S. Pat. No. 3,274,145, issued Sep. 20, 1966, which is hereby incorporated by reference to show such polydiorganosiloxanes and their preparation. The polydiorganosiloxanes (a) are well known in the concerned art as the base ingredient of conventional one-package RTV silicone elastomer compositions.

The inorganic filler of component (b) functions as a reinforcing agent, and this component is added in order to improve the postcure mechanical properties of the silicone elastomer. Subject inorganic filler is typically a microparticulate silica, such as a dry-process silica or wet-process silica, but calcium carbonate and the like may also be used. In the case of the microparticulate silicas, it will be advantageous to use silicas with a BET surface of 50 to 400 m²/g. These microparticulate silicas readily adsorb water on the surface, and the properties of compositions prepared according to the present method can suffer when this moisture fraction becomes too large. It will therefore be desirable to reduce the adsorbed water to the greatest extent possible prior to addition of the silica. The microparticulate silicas may be directly employed without modification, but may also be used after treatment in order to hydrophobicize the surface. These hydrophobicized silicas are exemplified by hexamethyldisilazane-treated silica, dimethyldichlorosilane-treated silica, trimethylmethoxysilane-treated silica, and so forth. Component (b) should be added at 5 to 200 parts by weight per 100 parts by weight component (a) for the following reasons: additions below 5 parts by weight do not induce an adequate reinforcing effect in the cured silicone elastomer; additions in excess of 200 parts by weight result in a loss of elasticity by the cured product and make it difficult to extrude the composition from its container.

Components (a) and (b) are mixed in the first step according to the present invention. The means for mixing these two components is, however, not crucial. In order to prevent the admixture of moisture, mixing should be conducted in a mixing environment that excludes the atmosphere, for example, in a closed container under a nitrogen atmosphere. However, mixing may also be carried out under ambient conditions in contact with the atmosphere if it is followed by removal of the moisture from the product concurrent with degassing prior to the second step.

In step (2) of the method, a vinyltrioximosilane is blended into the product from step (1). The vinyltrioximosilane is one of the components functioning as crosslinker in the one-package RTV silicone elastomer compositions prepared according to the present invention. The vinyltrioximosilanes are represented by the general formula $$CH_2=CHSi(OX)_3$$

wherein each X is an organic radical with the formula $-N=CR^1R^2$ $R^1$ and $R^2$ each represent a monovalent hydrocarbon radicals having no more than 6 carbon atoms per radical; an organic radical with the formula

where $R^3$ represents a divalent hydrocarbon radicals having no more than 10 carbon atoms; or a $C_1$ to $C_4$ monovalent hydrocarbon radical with the proviso that $C_1$ to $C_4$ monovalent hydrocarbon radicals constitute no more than 30 mole % of X. A typical example of the vinyltrioximosilane is vinyltri (methyl ethyl ketoximo)silane. The vinyltrioximosilane must be added in an amount sufficient to react with the terminal hydroxyl groups in the polydiorganosiloxane (a), and, moreover, must be added in sufficient amount to avoid gelation of the composition or an increase in its viscosity up to step (3). This component should be added at 0.5 to 7 parts by weight per 100 parts by weight of (a) and preferably at 0.5 to 5 parts by weight per 100 parts by weight of (a), although it should be understood that this quantity of addition cannot be unconditionally specified due its substantial variation as a function of such parameters as the starting materials used for the composition, the preparative procedures, and so forth. The means for mixing in the vinyltrioximosilane is also not crucial, but mixing is preferably carried out in an environment that avoids contact with air and the admixture of bubbles. Some temperature rise will occur during mixing, but the temperature desirably does not exceed 150° C. and even more preferably does not exceed 100° C.

The method then continues with the execution of step (3). In this step, the product from step (2) is blended with organosilane (d) having the formula $R^4Si(OX)_3$ in which $R^4$ represents a saturated monovalent hydrocarbon radical containing no more than 6 carbons and X is defined as above. This organosilane, like the vinyltrioximosilane used in step (2), functions as a crosslinker in the resulting one-package RTV silicone elastomer compositions. Typical examples of subject organosilane are methyltri(methyl ethyl ketoximo) silane, n-propyltri(methyl ethyl ketoximo)silane, phenyltri (methyl ethyl ketoximo)silane, methyltri(dimethyl ketoximo)silane, and the like. Organosilane (d) is preferably added in an amount at least as large as that of the vinyltrioximosilane, but again it should be understood that this quantity of addition cannot be unconditionally specified due its substantial variation as a function of such parameters as the starting materials used for the composition, the preparative procedures, and so forth. It is desirable to allow at least 30 seconds to elapse from the end of step (2) to the beginning of step (3). At shorter waiting periods the vinyltrioximosilane cannot adequately cap the terminals of the polydiorganosiloxane by a condensation reaction, and this will impair the full development of the properties of the compositions afforded by the method according to the present invention.

It is recommended that a cure-accelerating catalyst be added on an optional basis to the one-package RTV silicone elastomer compositions. The cure-accelerating catalyst is preferably admixed during step (3). Insofar as the functionality of the composition according to the present invention is not impaired, subject cure-accelerating catalyst may be any of those compounds already known for use in condensation reaction-curing silicone compositions. The cure-accelerating catalyst is exemplified by tin catalysts such as the dialkyltin dicarboxylates, by titanate esters such as tetrabutyl titanate, and by amine catalysts such as tetramethylguanidine. These catalysts are generally used singly, but combinations of two or more types may also be used. This component, when added, is desirably added at no more than 5 parts by weight per 100 parts by weight of the polydiorganosiloxane. Additions in excess of 5 parts by weight exercise a number of ill effects, such as yellowing and causing a deterioration in the moisture resistance and heat resistance.

The following may be added to compositions prepared according to the present invention as long as the object of the present invention is not impaired: polydiorganosiloxanes such as silanol-free polydiorganosiloxanes, resins such as silicone resins, fluidity adjusters, plasticizers, adhesion promoters, pigments, heat stabilizers, flame retardants, organic solvents, and so forth.

The compositions produced by the method according to the present invention as described above are nonyellowing and are characterized by an excellent precure workability or processability and by resistance to cracking or fissuring at the surface during curing even when deformed by an outside force.

The present invention will be explained in greater detail in the following through working and comparative examples. The viscosities reported in the examples are the values at 25° C., and $m^2/s$ is an abbreviation for square meters per second. The polydiorganosiloxane A referenced below was a mixture of 70 weight % polydimethylsiloxane (viscosity=0.017 $m^2/s$) endblocked at both terminals by hydroxyl and 30 weight % polydimethylsiloxane (viscosity= 0.017 $m^2/s$) endblocked at one terminal by hydroxyl and endblocked at the other terminal by trimethylsiloxy.

The following test methods were used to evaluate the properties of the compositions prepared in the working and comparative examples.

TACK-FREE TIME

Tack-free-time was evaluated as an index of the working time. The evaluation method was in accordance with Japanese Industrial Standard (JIS) A-5758.

SURFACE CRACKING TIME

Surface cracking time was evaluated as an index of the tendency for the silicone elastomer composition to crack during the course of its cure. The test method involved preparing test specimen by first applying a silicone elastomer composition on 10 or more aluminum sheets, curing for a prescribed period of time at 25° C., and then executing a 180° fold in each aluminum sheet at predetermined time intervals. The time interval required until a curing composition of a test specimen showed no occurrence of cracking in the surface at the fold of the test specimen was defined as the surface cracking time. The surface cracking time was determined by folding one of the coated test specimen at 180 degrees during the curing process about every 5 minutes (measured from the time when an aluminum sheet's coating operation with a silicone elastomer composition was completed) for the first 30 minutes and then every 10 to 30 minutes thereafter. Surface cracking time of 60 minutes or less are taken as a low probability of cracking during the course of curing.

YELLOWING

After its preparation, the silicone elastomer composition was filled into a plastic cartridge and held for 8 weeks in a 95% humidity/40° C. atmosphere. The cartridge was then cut open, and the color change in the silicone elastomer composition was inspected.

EXAMPLE 1

While operating under a nitrogen atmosphere, 11.5 g dry-process silica with a BET surface of 130 $m^2/g$ (surface hydrophobicized with hexamethyldisilazane and dimethyldichlorosilane) was thoroughly mixed into 100 g polydiorganosiloxane A. This was followed by the mixing under a nitrogen atmosphere of 1.39 g vinyltri(methyl ethyl ketoximo)silane as crosslinker. After then waiting 15 minutes, the following were thoroughly mixed in while operating under a nitrogen atmosphere: 6.81 g methyltri (methyl ethyl ketoximo)silane as supplemental crosslinker, 0.86 g gamma-(2-aminoethyl)aminopropyltrimethoxysilane as adhesion promoter, and 0.25 g dibutyltin dilaurate as curing catalyst. The properties of the resulting one-package RTV silicone elastomer composition were measured and the results were as reported in Table 1.

COMPARATIVE EXAMPLE 1

While operating under a nitrogen atmosphere, 11.5 g dry-process silica with a BET surface of 130 $m^2/g$ (surface hydrophobicized with hexamethyldisilazane and dimethyldichlorosilane) was thoroughly mixed into 100 g polydiorganosiloxane A. This was followed by the mixing under a nitrogen atmosphere of 1.39 g methyltri(methyl ethyl ketoximo)silane as crosslinker. After then waiting 5 minutes, the following were thoroughly mixed in while operating under a nitrogen atmosphere: 6.81 g vinyltri (methyl ethyl ketoximo)silane as supplemental crosslinker, 0.86 g gamma-(2-aminoethyl)aminopropyltrimethoxysilane as adhesion promoter, and 0.25 g dibutyltin dilaurate as curing catalyst. The properties of the resulting one-package RTV silicone elastomer composition were measured and the results were as reported in Table 1.

COMPARATIVE EXAMPLE 2

While operating under a nitrogen atmosphere, 11.5 g dry-process silica with a BET surface of 130 $m^2/g$ (surface hydrophobicized with hexamethyldisilazane and dimethyldichlorosilane) was thoroughly mixed into 100 g polydiorganosiloxane A. This was followed by the mixing under a nitrogen atmosphere of 1.39 g methyltri(methyl ethyl ketoximo) silane as crosslinker. After then waiting 5 minutes, the following were thoroughly mixed in while operating under a nitrogen atmosphere: 6.81 g methyltri (methyl ethyl ketoximo)silane as supplemental crosslinker, 0.86 g gamma-(2-aminoethyl)aminopropyltrimethoxysilane as adhesion promoter, and 0.25 g dibutyltin dilaurate as curing catalyst. The properties of the resulting one-package RTV silicone elastomer composition were measured and the results were as reported in Table 1.

COMPARATIVE EXAMPLE 3

While operating under a nitrogen atmosphere, 11.5 g dry-process silica with a BET surface of 130 $m^2/g$ (surface hydrophobicized with hexamethyldisilazane and dimethyldichlorosilane) was thoroughly mixed into 100 g polydiorganosiloxane A. This was followed by the mixing under a nitrogen atmosphere of 1.39 g vinyltri(methyl ethyl ketoximo)silane as crosslinker. After then waiting 5 minutes, the following were thoroughly mixed in while operating under a nitrogen atmosphere: 6.81 g vinyltri(methyl ethyl ketoximo)silane as supplemental crosslinker, 0.86 g gamma-(2-aminoethyl)aminopropyltrimethoxysilane as adhesion promoter, and 0.25 g dibutyltin dilaurate as curing catalyst. The properties of the resulting one-package RTV silicone elastomer composition were measured and the results were as reported in Table 1.

TABLE 1

|  | Example 1 | Comp. Ex. 1 | Comp. Ex. 2 | Comp. Ex. 3 |
|---|---|---|---|---|
| Tack-Free Time (minutes) | 5 | 5 | 6 | 6 |
| Surface Cracking Time (minutes) | 10 | 80 | 80 | 15 |
| Yellowing | no | no | no | yes |

Effects of the Invention

The method according to the present invention for the preparation of one-package RTV silicone elastomer compositions is able to provide nonyellowing compositions that are highly workable prior to their cure and that during their cure do not crack or fissure even when deformed by an outside force.

That which is claimed is:

1. A method for the preparation of a one-package, room-temperature-vulcanizable silicone elastomer compositions comprising
   (1) mixing
      (a) 100 parts by weight of a silanol-endblocked polydiorganosiloxane having a viscosity at 25° C. of 0.0005 to 0.3 m²/s and
      (b) 5 to 200 parts by weight per 100 parts by weight of (a) of inorganic filler,
   (2) admixing into the product obtained from (1)
      (c) 0.5 to 7 parts by weight per 100 parts by weight of (a) of vinyltrioximosilane with the following formula $CH_2=CHSi(OX)_3$ wherein each X is an organic radical with the formula $-N=CR^1R^2$ where $R^1$ and $R^2$ both represent a monovalent hydrocarbon radicals having no more than 6 carbon atoms per radical; an organic radical with the formula $-N=C-R^3$ where $R^3$ represents divalent hydrocarbon radicals having no more than 10 carbon atoms; or a $C_1$ to $C_4$ monovalent hydrocarbon radical with the proviso that $C_1$ to $C_4$ monovalent hydrocarbon radicals constitute no more than 30 mole % of X; and allowing at least 30 seconds to elapse from the end of step (2) to the beginning of step (3);
   (3) admixing into the product obtained in (2)
      (d) 1 to 10 parts per 100 parts by weight of (a) by weight organosilane with the following formula $R^4Si(OX)_3$ wherein $R^4$ represents a saturated monovalent hydrocarbon radicals having no more than 6 carbon atoms and X is defined as above.

2. The method according to claim 1 for the preparation of a one-package, room-temperature-vulcanizable, silicone elastomer composition, in which the inorganic filler is a microparticulate silica.

3. The method according to claim 2 for the preparation of a one-package, room-temperature-vulcanizable, silicone elastomer composition, in which the microparticulate silica is a hydrophobic microparticulate silica.

* * * * *